US008303702B2

(12) United States Patent
Von Rymon Lipinski et al.

(10) Patent No.: US 8,303,702 B2
(45) Date of Patent: Nov. 6, 2012

(54) PREPARATION FOR PRODUCING REFRACTORY MATERIALS

(75) Inventors: Tadeusz Von Rymon Lipinski, Bonn (DE); Christoph Tontrup, Alzenau (DE); Wolfgang Lortz, Waechtersbach (DE); Christoph Batz-Sohn, Hanau-Mittelbuchen (DE)

(73) Assignee: Evonik Degussa GmbH, Essen (DE)

( * ) Notice: Subject to any disclaimer, the term of this patent is extended or adjusted under 35 U.S.C. 154(b) by 378 days.

(21) Appl. No.: 12/446,588

(22) PCT Filed: Sep. 19, 2007

(86) PCT No.: PCT/EP2007/059897
§ 371 (c)(1),
(2), (4) Date: Apr. 22, 2009

(87) PCT Pub. No.: WO2008/052844
PCT Pub. Date: May 8, 2008

(65) Prior Publication Data
US 2010/0029463 A1 Feb. 4, 2010

(30) Foreign Application Priority Data
Nov. 2, 2006 (DE) .......................... 10 2006 051 661

(51) Int. Cl.
*C09D 1/00* (2006.01)
*C09K 17/40* (2006.01)
*C04B 35/00* (2006.01)
*C04B 35/03* (2006.01)
*C04B 35/04* (2006.01)

(52) U.S. Cl. .................... 106/286.4; 501/98.1; 501/108; 501/120; 106/286.5; 106/287.17

(58) Field of Classification Search .................... 501/94, 501/96.1, 96.3, 96.4, 97.1, 98.1, 98.4, 108, 501/118, 119, 120, 126, 127, 132, 133, 153; 264/603, 669, 681; 106/286.1, 286.5, 286.4, 106/287.17, 436
See application file for complete search history.

(56) References Cited

U.S. PATENT DOCUMENTS

| | | | |
|---|---|---|---|
| 3,892,584 A | | 7/1975 | Takeda et al. |
| 4,019,558 A | | 4/1977 | Szabo |
| 4,349,637 A | * | 9/1982 | Miedaner et al. ............. 501/126 |
| 4,913,840 A | * | 4/1990 | Evans et al. ...................... 516/79 |
| 5,989,515 A | * | 11/1999 | Watanabe et al. ............. 423/625 |
| 6,171,573 B1 | | 1/2001 | Sato |
| 6,558,613 B1 | * | 5/2003 | Gauckler et al. .............. 264/669 |
| 2005/0146066 A1 | * | 7/2005 | Koide et al. ..................... 264/44 |

FOREIGN PATENT DOCUMENTS

| | | |
|---|---|---|
| DE | 26 05 906 A1 | 9/1976 |
| EP | 0 355 816 A2 | 2/1990 |
| EP | 0 717 008 A1 | 6/1996 |
| EP | 0 824 092 A1 | 2/1998 |
| EP | 0 839 775 A1 | 5/1998 |
| RU | 2 150 442 C1 | 6/2000 |
| WO | WO 2006/010523 A1 | 2/2006 |

OTHER PUBLICATIONS

Bogdan et al. Pyrogenic Silica and Alumina. Encyclopedia of Surface and Colloid Science. DOI: 10.1081/E-ESCS 120000089. Taylor & Francis, 2006. p. 5314-5328.*
Anonymous, "Disperal/Dispal", Sasol Brochure, [Online], XP-002463124, UR_:http://www.sasolgermany.de/fileadmin/doc/alumina/DISPERAL-DISPAL.GB_04.pdf>, Dec. 20, 2007, 11 pages.
S. Mukhopadhyay, et al., "Easy-to-use mullite and spinel sols as bonding agents in a high-alumina based ultra low cement castable", Ceramics International, vol. 28, No. 7, XP-004376585,2002, pp. 719-729.
S. Ghosh, et al., "Microstructures of refractory castables preprared with sol-gel additives", Ceramics International, vol. 29, No. 6, XP-004436559, 2003, pp. 671-677.
M. W. Vance, et al., "Steelplant Refractories Containing Alphabond Hydratable Alumina Binders", Alcoa Technical Bulletin, [Online], XP-002463125, URL:http://www.almatis.nl/download/technical-papers/ABpaper.pdf>, Dec. 20, 2007, 31 pages.
Russian Office Action issued Nov. 24, 2010, in Patent Application No. 2009 120 576 (English-language translation only).
Japanese Office Action issued Dec. 1, 2011, in Patent Application No. 2009-535044 (English-language translation only).
Office Action issued Jan. 19, 2012 in Europe Application No. 07 820 341.1.
Hussey, et al., "Advanced Technical Ceramics Directory and Databook", Oxide Ceramics—Data Sheet, Alcan C-71, Mar. 31, 1998, p. 119.
Evonik Industries, "Aerosil ® R 972: Hydrophobic Fumed Silica", Feb. 2008, 1 page.

* cited by examiner

*Primary Examiner* — Noah Wiese
(74) *Attorney, Agent, or Firm* — Oblon, Spivak, McClelland, Maier & Neustadt, L.L.P.

(57) ABSTRACT

Preparation for producing refractory materials, characterized in that it comprises one or more particulate, refractory components and one or more binders, where—the particulate, refractory component has a mean particle diameter of >0.3 m and—the binder is selected from among—from 0.05 to 50% by weight of a very finely particulate binder having a mean particle diameter of from 10 nm to 0.3 m selected from the group consisting of aluminum oxide, titanium dioxide, zirconium dioxide and/or mixed oxides of the abovementioned oxides, —from 0 to 20% by weight of an inorganic binder, from 0 to 20% by weight of a hydraulically setting binder, —from 0 to 15% by weight of an organic, silicon-free binder—and the preparation additionally contains from 0 to 35% by weight of water, where—the proportion of the particulate, refractory component is equal to 100 and the percentages of the further materials in the preparation are based on the particulate component.

19 Claims, No Drawings

PREPARATION FOR PRODUCING REFRACTORY MATERIALS

The invention relates to a preparation for producing refractory materials and also its production. The invention further relates to a green body which can be obtained by means of the preparation. The invention further relates to a process for producing a refractory material using the preparation or the green body.

Refractory materials are ceramic products which are used for protection against high temperatures in various industrial plants. The main customers for refractory materials are the steel, glass, cement and nonferrous metals industries. Depending on the production and used technology, refractory materials are employed as shaped and unshaped products.

To produce the shaped products, for example bricks, raw materials having differing particle sizes are processed to produce a pressing composition and this is pressed, axially or isostatically, sometimes under very high pressing pressures in suitable pressing moulds. The finished compacts are then passed to further process steps such as drying and firing.

Another technique for producing finished components is casting of raw materials which have been processed to produce a slip. The slip is introduced into suitable casting moulds and is consolidated there to form a solid body. After removal from the mould, the green body can be passed to further process steps such as drying and firing.

In the case of unshaped refractory products, the raw materials are processed to obtain the desired consistency and installed on site as a castable, gunning or ramming composition to produce a refractory layer (lining).

In the processing of the refractory raw materials, various additives and auxiliaries are employed. Binders are of great importance here.

In the case of shaped products, the binders ensure sufficient strength of the green bodies so that these can be handled and conveyed to subsequent process steps.

In unshaped refractory materials, too, suitable binders play an important role. They give the initial composition a required strength after curing and thereby make defect-free installation of refractory linings possible.

Conventional organic binders such as cellulose derivatives, sulphite liquor, tar, pitch, resins, in particular phenolic resins, decompose or volatilize at temperatures above about 250° C. and thus increase the porosity and the susceptibility to corrosion. In addition, this results in a "strength gap" at temperatures of <1000° C. In this temperature range, the materials have very little, if any, mechanical strength.

When conventional inorganic binders such as phosphoric acid, aqueous solutions of salts, water glass and silica sols are used, the introduction of foreign substances can lead to undesirable contamination of the product produced by melting or firing, for example steel, which is in contact with the refractory material. In addition, a deterioration in the corrosion resistance and the thermomechanical properties of the refractory material can occur.

In the case of hydraulic binders such as cements, in particular refractory cements based on calcium aluminate and hydratable aluminas, a disadvantage is that they decompose in the range <1000° C., as a result of which the mechanical strength is greatly reduced (occurrence of a strength gap). Introduction of foreign CaO into the microstructure of the material can lead to a deterioration in the corrosion resistance and the thermomechanical properties.

It was an object of the invention to provide a preparation which does not give rise to the abovementioned disadvantages of the prior art in the production of refractory materials. Thus, the preparation should, in particular, make it possible to reduce the amount of traditional binders or to dispense with these binders entirely.

The invention provides a preparation for producing refractory materials which comprises one or more particulate, refractory components and one or more binders, where
the particulate, refractory component has a mean particle diameter of >0.3 μm and
the binder is selected from among
from 0.05 to 50% by weight of a very finely particulate binder having a mean particle diameter of from 10 nm to 0.3 μm selected from the group consisting of aluminium oxide, titanium dioxide, zirconium dioxide and/or mixed oxides of the abovementioned oxides,
from 0 to 20% by weight of an inorganic binder,
from 0 to 20% by weight of a hydraulically setting binder,
from 0 to 15% by weight of an organic, silicon-free binder
and the preparation additionally contains from 0 to 35% by weight of water, where
the proportion of the particulate, refractory component is equal to 100 and the percentages of the further materials in the preparation are based on the particulate component.

The expression "The proportion of the particulate, refractory component is equal to 100 and the percentages of the further materials in the preparation are based on the particulate component" is understood to mean that the proportions of the components in the composition are not based on the composition itself, but on the proportion of the particulate, refractory component, which is set to be 100. For example, the amount of the particulate, refractory component in the composition is 150 g and the amount of the very finely particulate binder is 30 wt. %, corresponding to 45 g.

The sum of particulate component and very finely particulate binder in the preparation of the invention is preferably at least 70% by weight, particularly preferably at least 85% by weight, based on the total amount of the preparation.

The very finely particulate binder present in the preparation of the invention has a mean particle diameter of from 10 nm to 0.3 μm. In the case of coarser materials, the green strength which can be achieved decreases greatly at the same amount added. It has been found that very small diameters can have advantages in the future refractory material. Particles having a mean particle diameter of from 40 to 300 nm have been found to be well suited. If the particles are present in aggregated form, the mean particle diameter is the mean aggregate diameter. The mean particle diameter or mean aggregate diameter can be determined, for example, by means of dynamic light scattering.

The proportion of very finely particulate binder can preferably be from 0.1 to 20% by weight and particularly preferably from 0.1 to 3% by weight.

A preparation according to the invention which contains aluminium oxide or titanium dioxide or zirconium dioxide as very finely particulate binder can be preferred. The very finely particulate binder can also be a combination of aluminium oxide and titanium dioxide, or aluminium oxide and zirconium dioxide, or aluminium oxide and a mixed oxide of aluminium oxide and titanium dioxide, or aluminium oxide and a mixed oxide of aluminium oxide and zirconium dioxide, or aluminium oxide and a mixed oxide of titanium dioxide and zirconium dioxide; or aluminium oxide and titanium dioxide and zirconium dioxide; or titanium dioxide and zirconium dioxide, or titanium dioxide and a mixed oxide of aluminium oxide and titanium dioxide, or titanium dioxide and a mixed oxide of aluminium oxide and zirconium dioxide, or titanium dioxide and a mixed oxide of titanium dioxide and zirconium dioxide; or zirconium dioxide and a mixed oxide of aluminium oxide and titanium dioxide, or zirconium dioxide and a mixed oxide of aluminium oxide and zirconium dioxide, or zirconium dioxide and a mixed oxide of titanium dioxide and zirconium dioxide.

In principle, the origin of the metal oxides is not restricted, as long as the mean particle diameter is in the range from 10 nm to 0.3 μm. Thus, for example, products produced by precipitation or by sol-gel processes can be present in the preparation. These include, for example, dispersible aluminium oxide in the boehmite form (for example Disperal HP 14/2 produced by Sasol).

It has been found to be advantageous to use, in particular, preparations which contain pyrogenic aluminium oxides, titanium dioxides or zirconium dioxides for producing refractory materials.

Here, pyrogenic oxides are aluminium oxides, titanium dioxides and aluminium-titanium mixed oxides which can be obtained by flame hydrolysis and/or flame oxidation and are produced by hydrolysis and/or oxidation of metal compounds in the gas phase in a flame, in general a hydrogen/oxygen flame. Here, finely divided, nonporous primary particles are initially formed and in the further course of the reaction these grow together to form aggregates and the latter can agglomerate further to form agglomerates. The primary particles are largely free of pores and have acidic or basic sites on their surface. The BET surface area of these primary particles is in the range from 5 to 600 $m^2/g$, with the BET surface area of aluminium oxide, titanium dioxide, zirconium dioxide and mixed oxides thereof generally being from 20 to 200 $m^2/g$.

Pyrogenic metal oxides have a high purity. In particular, the preparation of the invention can contain one or more pyrogenic metal oxides having an alkali metal content and alkaline earth metal content of not more than 0.01% by weight and/or an $SiO_2$ content of not more than 0.2% by weight.

A preparation according to the invention in which from 0.05 to 20% by weight of pyrogenic aluminium oxide having a BET surface area of from 40 to 180 $m^2/g$ and a mean aggregate diameter of from 40 to 300 nm is present as sole very finely particulate binder can be particularly preferred.

A preparation according to the invention in which from 0.1 to 10% by weight of pyrogenic aluminium oxide having a BET surface area of from 50 to 150 $m^2/g$, preferably 50 to 130 $m^2/g$, and a mean aggregate diameter of from 60 to 150 nm is present as sole very finely particulate binder can be very particularly preferred.

The particulate, refractory component which is present in the preparation of the invention can preferably be selected from the group consisting of aluminium oxide, magnesium oxide, magnesium aluminate, zirconium dioxide, calcium oxide, silicon dioxide, magnesium silicate, calcium silicate, zirconium silicate, mullite, calcium aluminate, silicon carbide, silicon nitride, SiALON, aluminium nitride, aluminium oxynitride and chromium oxide. Preference is given to a mean particle size of the particulate, refractory component of not more than 10 mm.

To improve the properties of the refractory materials, the preparation of the invention can contain additives such as metal powders of aluminium, silicon, magnesium, alloys of these metals, boron carbides, borides, aluminium nitrides, metal fibres, polymer fibres or carbon fibres. In general, the proportion of these is from 0.1 to 10% by weight, based on the particulate component of the preparation. In addition, free carbon such as graphite and industrial carbon black can be added in a proportion of <30% by weight, based on the particulate component of the preparation, to improve the properties.

The preparation of the invention contains from 0 to 35% by weight of water, which means that it can be water-free. The preparation of the invention preferably contains from 3 to 15% by weight of water. In this range, the preparation has the best processing properties.

The preparation of the invention contains from 0 to 20% by weight of inorganic binders. Suitable inorganic binders can be salts of sulphuric acid, salts of hydrochloric acid, salts of phosphoric acid, magnesium chloride, magnesium sulphate, monoaluminium phosphate, alkali metal phosphate, alkali metal silicate, water glass or colloidal silicon dioxide. A proportion of from 0 to 5% by weight is preferred. Particular preference is given to a preparation according to the invention which is free of inorganic binders.

The preparation of the invention contains from 0 to 15% by weight of hydraulically setting binders. Preference is given to a proportion of from 0 to 5% by weight. Particular preference is given to a preparation according to the invention which is free of hydraulically setting binders.

The preparation of the invention contains from 0 to 15% by weight of organic, silicon-free binders. Preference is given to a proportion of from 0 to 5% by weight. Particular preference is given to a preparation according to the invention which is free of organic, silicon-free binders.

In this context, "free" means that the preparation of the invention contains no inorganic, hydraulically setting or organic, silicon-free binder as binder but the constituents of these can be present as impurities in the very finely particulate binder.

The preparation of the invention can additionally contain additives in the form of plasticizers, setting regulators, dispersants, surface-modifying substances and/or pH-regulating substances. In general, they are present in a proportion of from 0.01 to 3% by weight.

A particularly preferred preparation contains from 0.1 to 4% by weight of pyrogenic aluminium oxide having a mean particle diameter of from 40 to 300 nm, contains from 3 to 15% by weight of water and is free of inorganic, hydraulically setting and organic, silicon-free binders.

The invention further provides a process in which the particulate, refractory component and the very finely particulate binder are mixed, if appropriate in the presence of water, inorganic binders, hydraulically setting binders, organic, silicon-free binders and/or additives.

For the present purposes, "mixing" encompasses, for example, mixing of the components by means of stirring, dispersing, shearing, shaking or vibration. The amounts of the components of the preparation which are required are the same as are present in the preparation. The constituents of the preparation are ideally mixed very homogeneously.

As very finely particulate binder, preference is given to using pyrogenic aluminium oxide having a BET surface area of from 50 to 180 $m^2/g$. Particularly suitable pyrogenic aluminium oxides are, for example, AEROXIDE® Alu C, AEROXIDE® Alu 65, AEROXIDE® VP Alu 130 Degussa; SpectrAl™ 51, SpectrAl™ 81, SpectrAl™ 100, all from Cabot.

Furthermore, a pyrogenic titanium dioxide having a BET surface area of from 40 to 100 $m^2/g$ can preferably be used.

Preference is also given to AEROIXDE TiO2 P25, Degussa, and the titanium dioxides disclosed in DE-A-102004055165. These are present as aggregates of primary particles, have a BET surface area of from 20 to 200 $m^2/g$, preferably from 40 to 60 $m^2/g$ and from 80 to 120 $m^2/g$, and have a width at half height WHH, in nanometers, of the primary particle size distribution of WHH $[nm]=a \times BET^f$ where $a=670 \times 10^{-9}$ m$^3$/g and $-1.3 \leq f \leq -1.0$ and a proportion of particles having a diameter of more than 45 μm in the range from 0.0001 to 0.05% by weight.

Preference is also given to the zirconia powders disclosed in EP-A-717008 and DE-A-102004039139.

In EP-A-717008 a pyrogenic zirconia powder having a BET surface area of from 20 to 200 m$^2$/g, the intergrown primary particles having a size of from 7 and 100 nm, a tamped density of from 40 to 150 g/l, a Sears number of from 1 to 20 ml/2 g and a chloride content of less than 0.6 wt. %.

The ZrO$_2$-containing powder disclosed in the German patent application DE-A-102004039139, which has the following features:

BET surface area: from 40 to 100 m$^2$/g, $d_n=3$ to 30 nm, $d_n=$number average primary particle diameter, yttrium content, calculated as yttrium oxide Y$_2$O$_3$ and determined by chemical analysis, of from 5 to 15% by weight, based on the mixed oxide powder, yttrium content of individual primary particles, calculated as yttrium oxide Y$_2$O$_3$ and determined by TEM-EDX, corresponding to the content in the powder±10%, content at room temperature, determined by X-ray diffraction and based on the mixed oxide powder, of monoclinic zirconium oxide of from <1 to 10% by weight of tetragonal zirconium oxide of from 10 to 95% by weight where the content of monoclinic zirconium oxide after heating at 1300° C. for two hours is less than 1% by weight, carbon content of less than 0.2% by weight, is also particularly suitable.

Particular embodiments and the definitions of parameters may be found in DE-A-102004039139.

Furthermore, a ZrO$_2$-containing powder which has the following features:

BET surface area: 60±15 m2/g, mean primary particle diameter: <20 nm, aggregate parameters:

mean surface area: <10 000 nm$^2$, mean equivalent circle diameter: <100 nm, mean aggregate circumference: <700 nm, content in each case based on the total amount of the powder:

of zirconium dioxide (ZrO$_2$): from 95 to 99.9% by weight, of hafnium dioxide (HfO$_2$): from 0.1 to 5% by weight, of carbon: from 0 to 0.15% by weight, of chloride: from 0 to 0.05% by weight where the sum of the proportions of zirconium dioxide and hafnium dioxide is at least 99.8% by weight, can be preferred.

Particular embodiments and the definitions of parameters may be found in DE-A-102004061698.

The very finely particulate binder can also be used in the form of an aqueous dispersion. It is however also possible to use the very finely particulate binder in the form of a dispersion whose liquid phase essentially or completely consist of at least one C$_1$-C$_4$ alcohol, such as methanol, ethanol, isopropanol, n-propanol, n-butanol, isobutanol and/or a diol such as ethylene glycol. Ethylene glycol is the most preferred liquid phase.

In particular a dispersion might be preferred comprising aluminum oxide or titanium dioxide as very finely particulate binder and ethylene glycol as liquid phase. Such a dispersion might be especially useful with a composition comprising magnesium oxide.

Preference is given to sols and dispersions which contain colloidal unaggregated particles, precipitated aggregated particles and/or pyrogenic particles. In particular, this can be a colloidal, unaggregated aluminium oxide sol, a precipitated, aggregated aluminium oxide, a pyrogenic aluminium oxide or a colloidal, unaggregated titanium dioxide sol, a precipitated, aggregated titanium dioxide, a pyrogenic titanium dioxide or a colloidal, unaggregated zirconium oxide sol, a precipitated, aggregated zirconium oxide or a pyrogenic zirconium oxide.

The solids content of the dispersion should be very high. It should preferably be at least 15% by weight, particularly preferably at least 30% by weight and very particularly preferably at least 40% by weight.

The dispersion should ideally be stable towards gellation and sedimentation over a relatively long period of time. This can be achieved, for example, by adjustment of the pH or increasing the zeta potential.

Particular preference is given to using an aluminium oxide dispersion which has a pH of from 3 to 9 and an aluminium oxide content of from 35 to 80% by weight and a mean aggregate diameter of less than 200 nm. It can be obtained by dispersing an aluminium oxide powder having a BET surface area of from 40 to 200 m$^2$/g in an aqueous phase.

Very particular preference is given to using an aluminium oxide dispersion which has a pH of from 6 to 9 and an aluminium oxide content of from 35 to 65% by weight and a mean aggregate diameter of from 40 to 150 nm. It can be obtained by dispersing an aluminium oxide powder having a BET surface area of from 50 to 120 m$^2$/g in an aqueous phase, with one or more at least dibasic hydroxycarboxylic acids, preferably citric acid, present as a solution in the dispersion being added to the aqueous phase. Such a dispersion is disclosed in the as yet unpublished German patent application number DE-A-102005032427.4 of 12 Jul. 2005.

Suitable, commercially available dispersions are, for example, NYACOL® AL 20, from Nyacol; CAB-O-SPERSE™ PG 003, CAB-O-SPERSE™ PG 008, both from Cabot; Wesol® D30, from Wesbond; AERODISP® W 630, VP Disp. W 640 ZX, VP Disp. W 630 X, VP Disp. W 440, VP Disp. W 460 ZX, VP Disp. W 740 X, VP Disp. W 2730 X, VP Disp. W 2650 X, VP Disp. W 2550 X, all from Degussa.

The invention further provides a process for producing a green body, in which the preparation of the invention is consolidated at temperatures of from 10 to 50° C. and subsequently at temperatures of from >50° C. to 200° C. by drying and/or by addition of a coagulating agent.

For this purpose, the preparation of the invention can be processed by the techniques customary in refractory technology, e.g. casting, vibrating, ramming or gunning.

For the present purposes, a coagulating agent is an agent which effects coagulation by increasing the ionic strength, by shifting the pH or by means of its surface charge in the case of the very finely particulate binder. The proportion of the coagulating agent is preferably from 0.05 to 10% by weight and particularly preferably from 0.1 to 5% by weight, based on the particulate component of the preparation. A coagulating agent which is preferably used is magnesium oxide.

The invention further provides a green body having a sufficiently high green strength which is obtained by means of the process of the invention. The green body has a good edge strength after shaping and good drying behaviour.

The invention further provides a process for producing shaped and unshaped refractory bodies, in which the green body according to the invention is treated at temperatures of from 200 to 2000° C.

The shaped and unshaped refractory bodies can also be obtained by a process in which the preparation is consolidated at temperatures of from 10 to 50° C. and subsequently at temperatures of from >50° C. to 200° C. by drying and/or by addition of a coagulating agent and the consolidated body is treated at temperatures of from >200° C. to 2000° C.

EXAMPLES

Starting Materials

Particulate Component:
Sintered α-alumina T60, 0.2-0.6 mm;
Sintered α-alumina T60, 0-0.3 mm;
Sintered α-alumina T60, 0-0.045 mm;
Calcined alumina CTC 50, all ALMATIS;
Sintered MgO, 0.5-1 mm
Sintered MgO, <0.125 mm
Sintered MgO, <63 μm, all from NEDMAG
Very Finely Particulate Binders:
AEROXIDE® Alu C (as powder), Degussa
Specific surface area (BET) 100±15 m2/g
Average primary particle size nm 13
Tapped density* (approx. value) 50 g/l,
  acc. to DIN EN ISO 787/11, August 1983
Moisture* <5.0 wt. % 2 hours at 105° C.
Ignition loss<3.0 wt. % 2 hours at 1000° C.,
  based on material dried for 2 hours at 105° C.
pH 4.5-5.5 in 4% dispersion
$Al_2O_3$-content>99.8 wt. % based on ignited material
Sieve residue (by Mocker 45 μm)<0.050 wt. %
acc. to DIN EN ISO 787/18, April 1984

The aluminium oxide dispersions AERODISP® W 460 ZX (dispersion 1), W 630 (dispersion 2) and VP Disp. W 440 (dispersion 3), all from Degussa, are used.

Composition and properties of these dispersions are shown in Table 1.

As plasticizers, Dispersing Alumina ADS and Dispersing Aluimina ADW, both from ALMATIS, are used.

Example 1

Comparison of Setting Times and Strengths of Preparations

Preparations according to the invention are obtained by mixing a particulate component comprising sintered α-alumina T60 0.2-0.6 mm (50% by weight), sintered α-alumina T60 0-0.3 mm (20% by weight), sintered α-alumina T60 0-0.045 mm (10% by weight) and calcined alumina CTC 50 (20% by weight), in each case based on the total particulate component, with 5% by weight, based on the total particulate component, of the dispersions 1-3 and make-up water.

The batches in the examples are calculated so that the proportions of the particulate components add up to 100. The proportions of the further materials in the preparation are based on the 100% value of the particulate components.

In addition, 1% by weight of a plasticizer is added in each case for the purpose of reducing the make-up water requirement, except in the case of dispersion 1. Dispersion 1 itself has exceptionally good fluidizing properties. The make-up water requirement is virtually identical in all preparations and is about 9-10% by weight.

To control the coagulation process and thus the setting behaviour, fine MgO powder (caustic magnesia, 5% by weight) is used.

After preparation of the mixture, it is poured into moulds and allowed to stand at room temperature in a humid atmosphere. After setting, the solidified test specimens are dried at 110° C. for 24 hours. A determination of the cold compressive strength (CCS determination) is carried out on the dried test specimens.

The composition, setting times and the CCS values are shown in Table 2.

The data in Table 2 show that the bodies bound by means of the aluminium oxide dispersions have a green strength sufficient for handling without conventional binders having to be used.

Example 2

Influence of the Amount of Aluminium Oxide on the Strength of the Refractory Concretes Preparations having the same particulate component are prepared as Example 1 for the experiments. Dispersion 1 is used as binder. The dispersion is added in amounts of 2, 3 and 5% by weight, based on the particulate component. To control the coagulation process, 2% by weight, based on the particulate component, of fine MgO powder (caustic magnesia) are added. The make-up water requirement is virtually identical in all preparations and is about 10% by weight.

The preparations which have been poured into moulds are dried as described in Example 1. Some of the dried test specimens are subjected to firing at 700° C. and 1500° C. with a hold time of 2 hours in each case.

The CCS determination was carried out on the dried and fired test specimens. The CCS values obtained are shown in Table 3.

An increasing firing temperature is accompanied by an increase in strength. A higher $Al_2O_3$ content results in higher strength values.

Example 3

Influence of the Amount of Magnesium Oxide on the Strength of the Refractory Concretes Preparations having the same particulate component are prepared as in Example 1 for the experiments. Dispersion 1 is used as binder. The amount added is 3% by weight.

To control the coagulation process, 1 and 2% by weight of a fine MgO powder (caustic magnesia) are used. The make-up water requirement is virtually identical in both mixtures and is about 10% by weight.

The drying of the preparations which have been poured into moulds and the subsequent firing are carried out as described in Example 2. The CCS values obtained are shown in Table 4.

The results achieved show that a larger addition of caustic magnesia in the region of the low firing temperatures has no relevant influence on the strength of the refractory concretes bound by means of dispersion 1. After firing at 1500° C., a higher MgO content improves the strength of the material.

Example 4

Influence of the Nature of the MgO Coagulator on the Setting Time and Strength of the Refractory Concretes Preparations having the same particulate component are prepared as in Example 1 for the experiments. Dispersion 1 is used as binder. The amount added is 5% by weight.

To control the coagulation process of the dispersion, 5% by weight of an MgO powder in the form of a caustic magnesia and a fine (<0.1 mm) sintered MgO are used. The make-up water requirement is virtually identical in both mixtures and is about 10% by weight.

The drying of the preparations which have been poured into moulds and the subsequent firing are carried out as described in Example 2. The CCS values obtained are shown in Table 5.

The data in Table 5 show that, compared to caustic magnesia, less reactive sintered MgO significantly increases the setting time. The strength values for the test specimens containing sintered MgO are lower compared to those containing caustic magnesia. The results demonstrate the possibility of controlling the setting process by means of the nature of the MgO coagulator.

Example 5

Influence of the Type of the Very Finely Particulate $Al_2O_3$ Binder

Preparations having the same particulate component are prepared as in Example 1 for the experiments. As binders, use is made of the dispersions Nyacol AL 20 (20% by weight dry matter) and DISPERAL HP 14/2 (25% dry matter). Both dispersions are added in amounts of 3% by weight, based on the particulate component. To control the coagulation process, 3% by weight, based on the finely particulate component, fine MgO powder (caustic magnesia) are used. The make-up water requirement is virtually identical in all preparations and is about 9% by weight.

The preparations which have been poured into moulds are dried as described in Example 1. Some of the dried test specimens are subjected to firing at 1500° C. with a hold time of 2 hours in each case.

The CCS determination was carried out on the dried and fired test specimens. The CCS values obtained are shown in Table 6.

Compared to dispersions 1, 2 and 3, Disperal HP14/2 and Nyacol AL 20 display satisfactory but significantly lower strength values than the particularly preferred dispersions both after drying and after firing at 1500° C.

Example 6

Use of $Al_2O_3$ Dispersion for Producing MgO Refractory Concretes

Preparations according to the invention for producing a MgO refractory concrete are obtained by mixing a particulate component comprising sintered MgO 0.5-1 (50% by weight), a sintered MgO<0.125 mm (30% by weight) and a sintered MgO<63 µm (20% by weight), in each case based on the particulate component, with 3% by weight, based on the total particulate component, of dispersion 1 and make-up water.

In addition, 0.4% by weight of a plasticizer is added for the purpose of reducing the make-up water requirement. The make-up water requirement is about 10% by weight.

To control the coagulation process and thus the setting behaviour, fine MgO powder (caustic magnesia, 1% by weight) is used.

After preparation of the mixture, it is poured into moulds and allowed to stand at room temperature in a humid atmosphere. After setting, the solidified test specimens are dried at 110° C. for 24 hours. After drying, no cracks which would indicate a hydration process of the MgO could be found. Some of the dried test specimens are subjected to firing at 1500° C. with a hold time of 2 hours.

A determination of the CCS is carried out on the dried test specimens. The CCS values obtained are shown in Table 7.

The data in Table 7 show that a preparation according to the invention can be used for producing MgO refractory concretes which are free of conventional binders.

Example 8

Influence on Strength of Spinell Bricks Using as Very Fine, Particulate Binder

Preparations according to the invention are obtained by mixing magnesium aluminate and 0.2, 0.5 and 1.0 wt % AEROXIDE Alu C. Table 8 shows the relative increase in CCS. It can be seen that an increasing part of the very fine particulate binder gives additional strength to spinel bricks, reaching an optimum at about 0.5 wt. %.

The preparation according to the invention makes it possible to produce unshaped refractory products (tamping compositions, refractory concretes which flow without assistance) and shaped products (bricks, finished parts) having significantly improved properties (better mechanical properties, better resistance to slags).

In the production of the green body, the reduction in the make-up water requirement is advantageous, while the green body itself has the advantages of good edge stability after shaping and improved drying behaviour.

The refractory products obtained by means of the preparation of the invention display high materials densities and as a result an improved sinterability, mechanical strength and corrosion resistance.

The very finely particulate binders present in the preparation of the invention serve as permanent binder without a strength gap for shaped refractory products either alone or in combination with traditional both organic and inorganic binders.

The very finely particulate binders present in the preparation of the invention serve as permanent binder without a strength gap for unshaped, refractory products, in particular for compositions and concretes which are low in cement/free of cement, low in inorganic binders/free of inorganic binders and/or low in organic binders/free of organic binders.

TABLE 1

Composition and analytical values of the aluminium oxide dispersions

| Dispersion | Solids content % by weight | pH[a] | Viscosity mPas[b] | Mean aggregate diameter μm |
|---|---|---|---|---|
| 1 | 60 | 6-9 | ≤2000 | 0.08 |
| 2 | 30 | 3-5 | ≤2000 | 0.14 |
| 3 | 40 | 3-5 | ≤1000 | 0.12 |

[a] based on EN ISO 787-9;
[b] measured in accordance with DIN EN ISO 3219 as a shear rate of 100 s$^{-1}$/23° C.

TABLE 2

Composition and properties of the preparations from Example 1

| Binder | Water % by wt. | Plasticizers[2] % by wt. | MgO[3] % by wt. | Setting time min | CCS[4] MPa |
|---|---|---|---|---|---|
| Dispersion 1 | 9 | — | 5 | 10 | 11 |
| Dispersion 2 | 9 | 1 | 1 | 15 | 3.6 |
| Dispersion 3 | 9.5 | 1 | 1 | 35 | 4.5 |

[1] Comparative example;
[2] Ratio of 3:1 of Dispersing Alumina ADW to Dispersing Alumina ADS;
[3] Coagulating agent;
[4] Cold compressive strength (DIN EN 9935)

TABLE 3

CCS values of the test specimens having different amounts of added aluminium oxide

| Amount of dispersion 1 added | Equal to an amount of very finely particulate binder | 110° C. | 700° C. | 1500° C. |
|---|---|---|---|---|
| 2 wt. % | 1.2 wt. % | 3.0 | 4.1 | 56.2 |
| 3 wt. % | 1.8 wt. % | 4.9 | 6.5 | 78.7 |
| 5 wt. % | 3 wt. % | 7.9 | 9.4 | 75.0 |

TABLE 4

CCS values of the test specimens having different amounts of added caustic magnesia

| Amount of MgO added | CCS (MPa) | | |
|---|---|---|---|
| | 110° C. | 700° C. | 1500° C. |
| 1 | 4.4 | 5.3 | 64.1 |
| 2 | 4.9 | 6.5 | 78.7 |

TABLE 5

Setting time and CCS values of the test specimens having different MgO additions

| Coagulating agent | Setting time (min) | CCS (MPa) | | |
|---|---|---|---|---|
| | | 110° C. | 700° C. | 1500° C. |
| Caustic magnesia | 10 | 11 | 12.4 | 79.6 |
| Sintered MgO <0.1 mm | 370 | 7.7 | 7.9 | 57.0 |

TABLE 6

CCS values of the test specimens containing different dispersions

| Dispersion | CCS (MPa) | |
|---|---|---|
| | 110° C. | 1500° C. |
| DISPERAL HP14/2 | 1.5 | 20.9 |
| Nyacol AL 20 | 2.6 | 23.4 |

TABLE 7

CCS values of the test specimens of an MgO refractory concrete

| Material | CCS (MPa) | |
|---|---|---|
| | 110° C. | 1500° C. |
| MgO refractory concrete | 5.1 | 45.7 |

TABLE 8

Influence on strength of spinell bricks

| AEROXIDE Alu C [wt. %] | CCS relative [%] |
|---|---|
| 0 | 100 |
| 0.2 | 119.4 |
| 0.5 | 120.8 |
| 1.0 | 118.3 |

The invention claimed is:

1. A preparation for producing refractory materials, comprising:
   one or more particulate, refractory components;
   at least one binder; and
   3 to 15% by weight of water;
   wherein
   the particulate, refractory component has a mean particle diameter of greater than 0.3 μm and
   the at least one binder comprises:
     from 0.05 to 50% by weight of a very fine particulate binder having a mean particle diameter of from 10 nm to 0.3 μm, selected from the group consisting of a pyrogenic aluminum oxide, a pyrogenic titanium dioxide, a pyrogenic zirconium dioxide and mixed oxides thereof,
     from 0 to 20% by weight of an inorganic binder,
     from 0 to 20% by weight of a hydraulically setting binder, and
     from 0 to 15% by weight of an organic, silicon-free binder,
   where the proportion of the particulate, refractory component is equal to 100 and the percentages of the additional materials in the preparation are based on the particulate component.

2. The preparation according to claim 1, wherein the sum of said particulate component and said very fine particulate binders is at least 70% by weight, based on the total amount of the preparation.

3. The preparation according to claim 1, wherein the very fine particulate binder is selected from the group consisting of a pyrogenic aluminum oxide, a pyrogenic titanium dioxide and a pyrogenic zirconium dioxide.

4. The preparation according to claim 1, wherein the very fine particulate binder has a mean particle diameter of from 40 to 300 nm.

5. The preparation according to claim 1, wherein the particulate, refractory component is one or more compounds selected from the group consisting of aluminium oxide, magnesium oxide, magnesium aluminate, zirconium dioxide, calcium oxide, silicon dioxide, magnesium silicate, calcium silicate, zirconium silicate, mullite, calcium aluminate, silicon carbide, silicon nitride, SiAlON, aluminium nitride, aluminium oxynitride and chromium oxide.

6. The preparation according to claim 1, wherein the proportion of inorganic binders in the preparation is from 0 to 5% by weight.

7. The preparation according to claim 1, wherein the proportion of hydraulically setting binders in the preparation is from 0 to 5% by weight.

8. The preparation according to claim 1, wherein the proportion of organic, silicon-free binders in the preparation is from 0 to 5% by weight.

9. The preparation according to claim 1, comprising:
from 0.1 to 4% by weight of pyrogenic aluminium oxide having a mean particle diameter of from 40 to 300 nm, and
from 3 to 15% by weight of water
wherein the preparation is free of inorganic, hydraulically setting and organic, silicon-free binders.

10. A process for preparing the preparation according to claim 1, wherein the particulate, refractory component and the very fine particulate binder are mixed, in the presence of water, and optionally, in the presence of inorganic, hydraulically setting and/or organic, silicon-free binders.

11. The process according to claim 10, wherein the very fine particulate binder is added in the form of an aqueous dispersion.

12. The process according to claim 11, wherein the aqueous dispersion contains additives for adjusting the pH and for increasing the zeta potential.

13. The process according to claim 11, wherein the aqueous dispersion has a content of very fine particulate binder of at least 15% by weight.

14. A process for producing a green body, comprising:
consolidating the preparation according to claim 1 at temperatures of from 10 to 50° C. and subsequently at temperatures of from greater than 50° C. to 200° C. by drying and by the addition of a coagulating agent.

15. The process according to claim 14, wherein a proportion of coagulating agent is from 0.05 to 5% by weight, based on the preparation.

16. The process according to claim 14, wherein the coagulating agent is magnesium oxide.

17. A green body obtained by the process according to claim 14.

18. A process for producing shaped and unshaped refractory bodies, wherein the green body according to claim 17 is treated at temperatures of from greater than 200° C. to 2000° C.

19. A process for producing shaped and unshaped refractory bodies, comprising:
consolidating the preparation according to claim 1 at temperatures of from 10 to 50° C. and subsequently at temperatures of from greater than 50° C. to 200° C. by drying and by the addition of a coagulating agent and
treating the consolidated body at temperatures of from greater than 200° C. to 2000° C.

* * * * *